(12) United States Patent
King (10) Patent No.: US 10,371,172 B2
(45) Date of Patent: Aug. 6, 2019

(54) REDUCTION OF TURBOCHARGER CORE UNBALANCE WITH BALANCE WASHER

(71) Applicant: BorgWarner Inc., Auburn Hills, MI (US)

(72) Inventor: Denny King, Canton, NC (US)

(73) Assignee: BorgWarner Inc., Auburn Hills, MI (US)

( * ) Notice: Subject to any disclaimer, the term of this patent is extended or adjusted under 35 U.S.C. 154(b) by 161 days.

(21) Appl. No.: 14/429,369

(22) PCT Filed: Jan. 17, 2013

(86) PCT No.: PCT/US2013/021826
§ 371 (c)(1),
(2) Date: Mar. 19, 2015

(87) PCT Pub. No.: WO2014/062208
PCT Pub. Date: Apr. 24, 2014

(65) Prior Publication Data
US 2015/0219121 A1   Aug. 6, 2015

Related U.S. Application Data

(60) Provisional application No. 61/708,727, filed on Oct. 2, 2012.

(51) Int. Cl.
*F01D 5/02* (2006.01)
*F04D 29/66* (2006.01)
(Continued)

(52) U.S. Cl.
CPC ........... *F04D 29/668* (2013.01); *F01D 5/027* (2013.01); *F04D 17/10* (2013.01); *F04D 29/266* (2013.01); *F04D 29/284* (2013.01); *F04D 29/662* (2013.01); *F16B 43/00* (2013.01); *F16F 15/34* (2013.01); *F01D 5/025* (2013.01); *F05D 2220/40* (2013.01); *F16F 15/322* (2013.01); *Y10T 29/49245* (2015.01)

(58) Field of Classification Search
CPC . F01D 5/027; F01D 5/025; F01D 5/10; F01D 25/04; F04D 17/10; F04D 29/668; F04D 29/266; F04D 29/662; F16B 43/00; F16F 15/34; F16F 15/32; F05D 2260/96
USPC ........................................................ 411/531
See application file for complete search history.

(56) References Cited

U.S. PATENT DOCUMENTS

2002/0182088 A1   12/2002   Wu
2004/0131469 A1   7/2004   Billington
(Continued)

FOREIGN PATENT DOCUMENTS

| JP | 64056901 | 3/1989 | |
|---|---|---|---|
| WO | 2010111133 | 8/2010 | |
| WO | WO 2010111133 A2 * | 9/2010 | ............. F01D 5/027 |

*Primary Examiner* — Dwayne J White
*Assistant Examiner* — Behnoush Haghighian
(74) *Attorney, Agent, or Firm* — Eric L. Doyle; Stephan A. Pendorf; Patent Central LLC (57) ABSTRACT

Turbochargers operate at extremely high speed, so balance of the rotating core is of the utmost importance to turbocharger life. A special balancing washer is added to the clamping region between the compressor nut and the nose of the compressor wheel to aid in keeping the wheel, nut, and stub-shaft on the turbocharger axis and to thereby prevent introduction of core unbalance.

13 Claims, 12 Drawing Sheets

(51) Int. Cl.
*F16B 43/00* (2006.01)
*F04D 17/10* (2006.01)
*F16F 15/34* (2006.01)
*F04D 29/26* (2006.01)
*F04D 29/28* (2006.01)
*F16F 15/32* (2006.01)

(56) References Cited

U.S. PATENT DOCUMENTS

2007/0009360 A1* 1/2007 Alam .................. F01D 5/025
 416/144
2008/0203732 A1 8/2008 Ono et al.
2011/0083297 A1* 4/2011 Lin .................... F16B 43/00
 16/2.1

* cited by examiner

REDUCTION OF TURBOCHARGER CORE UNBALANCE WITH BALANCE WASHER

FIELD OF THE INVENTION

This invention eliminates a potential source of imbalance in high speed rotating assemblies, and in particular in rotating assemblies used in turbochargers.

BACKGROUND OF THE INVENTION

Turbochargers drive a compressor to deliver air at high density to the engine intake, allowing more fuel to be combusted, thus boosting the engine's horsepower. To do this, the rotating assembly of the turbocharger, comprising turbine wheel, compressor wheel, and shaft, may rotate at 80,000 RPM to 300,000 RPM. It is critical that the rotating assembly be balanced with a high degree of precision to improve efficiency and prevent premature wear.

The turbine wheel is materially fused to the shaft to make a shaft-and-wheel assembly. The shaft-and-wheel assembly is finished as a very accurately machined, unitary component with shaft diameters ground to tolerances in the 2.5 micron regime; thus, its inherent balance is quite good.

The compressor wheel, on the other hand, is an extremely difficult part to machine and balance. First, it is extremely critical to machine the bore (27) through the center of the compressor wheel such that it is centered on the hub at both the nose end face (21) and the hub end (22). Further, it is critical that the nut that secures the compressor to the shaft not introduce imbalance. While the nut is a relatively low mass item, for example, 6.3 gm in one case, its contribution to unbalance (as against balance) can be very large. The compressor nut must apply a heavy clamp load to the compressor wheel such that it will not rotate under any dynamic conditions, e.g., from accelerating from cold start to maximum speed, to decelerating from maximum speed at hot shutdown. The act of rotating the nut against the face (21), on the nose of the compressor wheel, can cause the nut to dig into the face and track off center, particularly when the nut is steel and the compressor wheel is aluminum. This tracking causes the mass center of the nut to move off the turbocharger axis, which results in an unbalance (N), equal to the mass of the nut times the displacement ($R_n$), perpendicular to the turbocharger axis.

The lower face (31) of the nut in contact with the compressor wheel must thus be manufactured to a very tight perpendicularity tolerance to the bore of the thread in the compressor nut, in the range of 0.03 to 0.04 mm, so that when the nut is threaded onto the shaft, and clamp load applied, the aforementioned lower face of the nut is applying a load close to normal to the face (21) on the nose of the compressor wheel. Failure to apply this load normal to the face of the compressor wheel will cause bending of the shaft, with the result that the mass of the compressor wheel, nut, and stub shaft will be displaced from the turbocharger axis (35) causing a large unbalance in the rotating assembly. Since this imbalance did not exist prior to tightening of the nut, it is known as "created imbalance".

U.S. Pat. No. 4,872,817 (De Kruif) teaches that when securing a compressor wheel to a shaft, each mounting face has the potential of being out of square with respect to the axis of the shaft. This suggests the engineering solution of introducing a washer, particularly of a metal harder than that of the compressor wheel. However, since a washer has two mounting faces, it can contribute doubly to the probability of created imbalance. Tightening of the nut then causes bending of the shaft member, thereby destroying any balance the assembly may have had when originally balanced. De Kruif recommends, instead of a washer, forming the rotor member with an annular groove about the nose portion at a point near its mounting face. During tightening of the nut, in the event of uneven force application, the remaining weakened flange-like lip gives way and crimps before any shaft bending occurs, thereby eliminating any bent-shaft induced rotor-shaft imbalance. However, this solution reduces the clamping load available to restrain the compressor wheel, which should preferably be quite high.

The goal of a turbocharger manufacturer is to offer product at the lowest cost, with the highest possible reliability and durability. Balance is a key factor in the durability and reliability facets.

SUMMARY OF THE INVENTION

The present inventor investigated improving balance by adding off-the-shelf standard washers, and discovered that such washers have poor parallelism and high mass, and tended to do more harm than good.

The present invention is based on the discovery that, contrary to conventional wisdom, the provision of a specifically selected washer between the nut and compressor wheel can in fact improve balance. The washer should be thin (to reduce inertia in the even that the washer is not fixed perfectly coaxially with the shaft axis of rotation). More importantly, the two faces of the washer should exhibit a high degree of planar parallelism. i.e., the opposite faces are defined by two planes which do not intersect. Since the washer exhibits a high degree of parallelism, tightening of the nut will distribute the load evenly about the circumference of the washer and prevent bending of the shaft. The washer also prevents the nut from gouging the compressor wheel.

By adding the inventive balance washer between the compressor nut and the compressor wheel, the nut is held true to the turbocharger axis and the unbalance forces of the nut, the stub shaft and the compressor wheel are minimized or non-existent.

The thickness of the washer is not critical. The washer may have a thickness of 0.003 inch (0.076 mm) to 0.02 inch (0.51 mm), preferably 0.005 inch (0.127 mm) to 0.018 inch (0.46 mm), most preferably from 0.01 inch (0.25 mm) to 0.015 inch (0.38 mm). The washer is preferably thin simply to minimize mass.

The important feature of the invention is to require parallelism of the washer. Parallelism is preferably determined by measuring the thickness of the washer at four cardinal points (or, at the 12, 3, 6 and 9 o'clock positions) using, e.g., a micrometer caliper. Preferably the thickness at each measured point is within +/−0.0001 of the median. The greater the parallelism, the better the ability to enhance balance.

A standard flat washer with, e.g., a ⅜" (9.5 mm) hole has an average thickness tolerance of +/−0.005", which would convert to parallelism of 0.010". The washer to be used in the present invention, in comparison, has a parallelism of 0.0002.

Washers are commercially available that have been machined to a high degree of parallelism, though they have not been employed for the purposes of the present invention. For example, Zhejiang Mayata Technology Co., Ltd. of China sells an extra precision flat washer with a thickness: 2 mm, parallelism: 3 µm, flatness: 3 µm and roughness: Ra. 0.16 µm.

BRIEF DESCRIPTION OF THE DRAWINGS

The present invention is illustrated by way of example and not limitation in the accompanying drawings in which like reference numbers indicate similar parts, and in which.

DETAILED DESCRIPTION OF THE INVENTION

Turbochargers (FIGS. 1 and 2) extract energy from a vehicle exhaust flow, which enters the turbine housing (2) to drive a turbine wheel (51), which is located in the turbine housing. The turbine wheel is solidly affixed to the turbine end of a shaft, becoming the shaft and wheel assembly (50). A compressor wheel (20) is mounted the other end of the shaft, referred to as the "stub shaft" (56), and the wheel is held in position by the clamp load from a compressor nut (30). The primary function of the turbine wheel is providing rotational power to drive the compressor.

Figure 1:
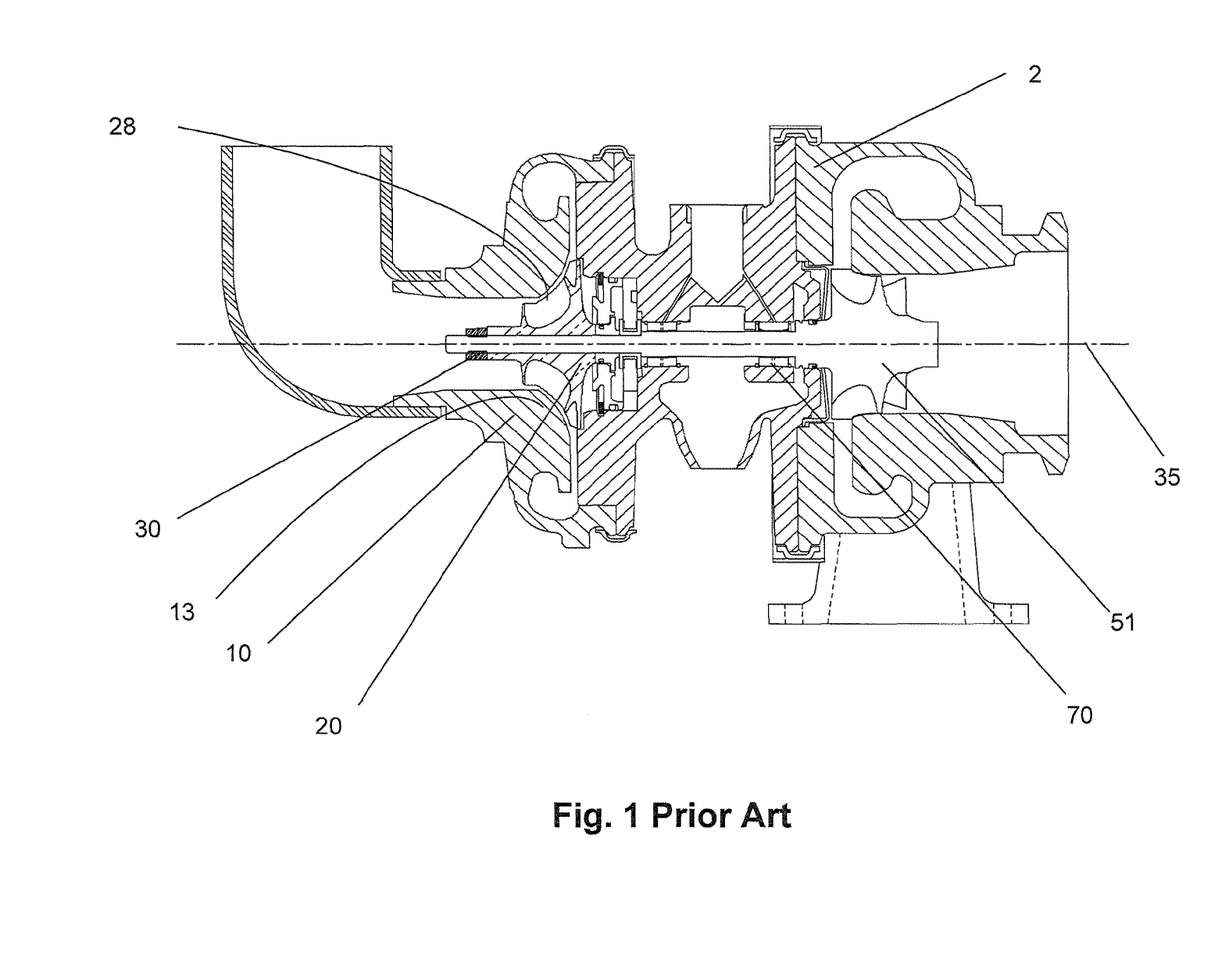
FIG. 1 depicts a section of a turbocharger assembly.

The compressor stage is mainly comprised of a wheel (20) and it's housing (10). Filtered air is drawn axially into the inlet of the compressor cover by the rotation of the compressor wheel (20). The power generated by the turbine stage to the shaft and wheel drives the compressor wheel to produce a combination of static pressure with some residual kinetic energy and heat.

In one aspect of compressor stage performance, the efficiency of the compressor stage is influenced by the clearances between the compressor wheel contour (28) and the matching contour (13) in the compressor cover. The closer the compressor wheel contour is to the compressor cover contour, the higher the efficiency of the stage. In a typical compressor stage with a 76 mm compressor wheel, the tip clearance is in the regime of from 0.31 mm to 0.38 mm. The closer the wheel is to the cover, the higher the chance of a compressor wheel rub, so there has to exist a compromise between improving efficiency and improving durability.

Figure 3:
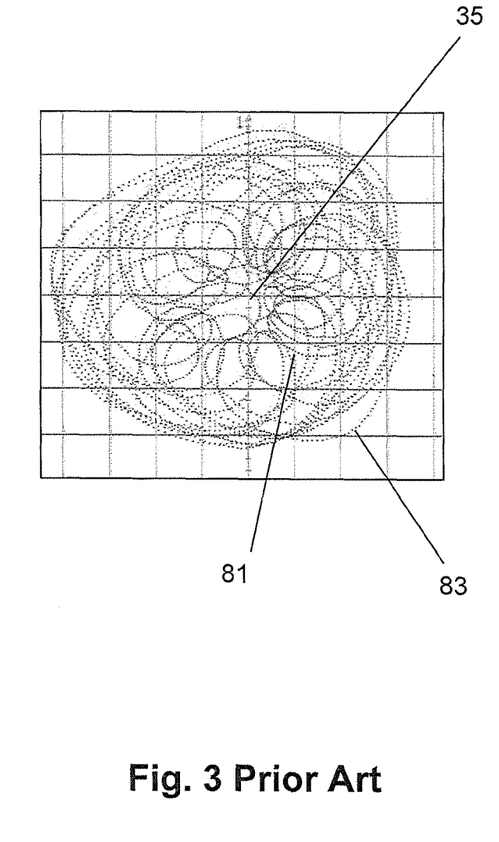
FIG. 3 depicts the orbits made in testing.
Figure 4:
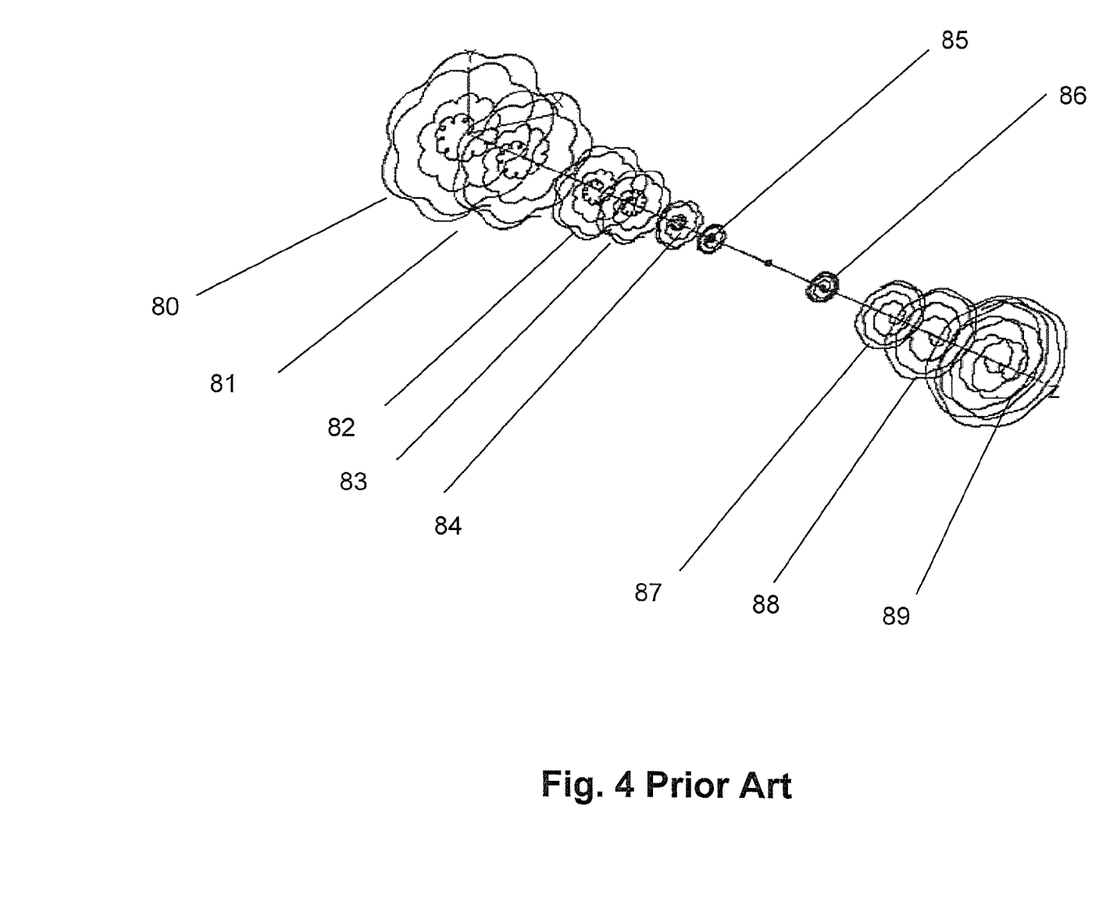
FIG. 4 depicts the orbits of individual components.

Viewed on an oscilloscope the wheel in a compressor stage does not rotate about the geometric axis of the turbocharger, but rather describes orbits roughly about the geometric center, as seen in FIG. 3. The geometric center (35) is the geometric axis of the turbocharger. The compressor end of the turbocharger, with data taken from a cylindrical nut, describes the orbit (81).

The dynamic excursions taken by the shaft are attributed to a number of factors including: the unbalance of the rotating assembly; the excitation of the pedestal (i.e., the engine and exhaust manifold); and the low speed excitation from the vehicle's interface with the ground.

As a dynamic assembly, the rotating assembly passes through several critical speeds. At the first critical speed, the critical mode is rigid body bending. In this mode the rotating assembly described a cylinder. At the second critical speed, the critical mode is again that of a rigid body, but in the conical mode about the outer ends of the bearing span. At the third critical speed the critical mode is that of shaft bending. The third critical speed occurs at from 50% to 70% of the speed range through which the turbocharger operates (namely, typically from about 30,000 up to 140,000 RPM). The first two critical speeds are much lower than that and are passed through very quickly during accelerations.

The first two modes are predominantly controlled by the bearing stiffness. The third mode, that of shaft bending, is predominately controlled by the stiffness of the shaft. The stiffness of the shaft is proportional to $D_s^4$, where $D_s$ is the diameter of the shaft.

The power losses due to the bearing system are predominantly controlled by $D_s^3$, so it can be seen that the control of the third critical mode is a compromise between power losses, thus efficiency and shaft bending. When there is an unbalance force acting on the rotating assembly at the compressor-end of the turbocharger, the stiffness of the shaft is a major factor in countering that force and also in allowing the turbocharger to continue to run after a compressor wheel rub against its cover.

After a loss of oil pressure or oil flow to any of the journal or thrust bearings, the predominant ultimate cause of turbocharger failure is contact between a wheel and cover. This contact can be as mild as a rub of the rotating wheel on the cover, or as serious as an impact of the wheel on the cover. To minimize the risk of this contact, the manufacturer takes many steps to build dynamic integrity into the rotating components.

Figure 2:
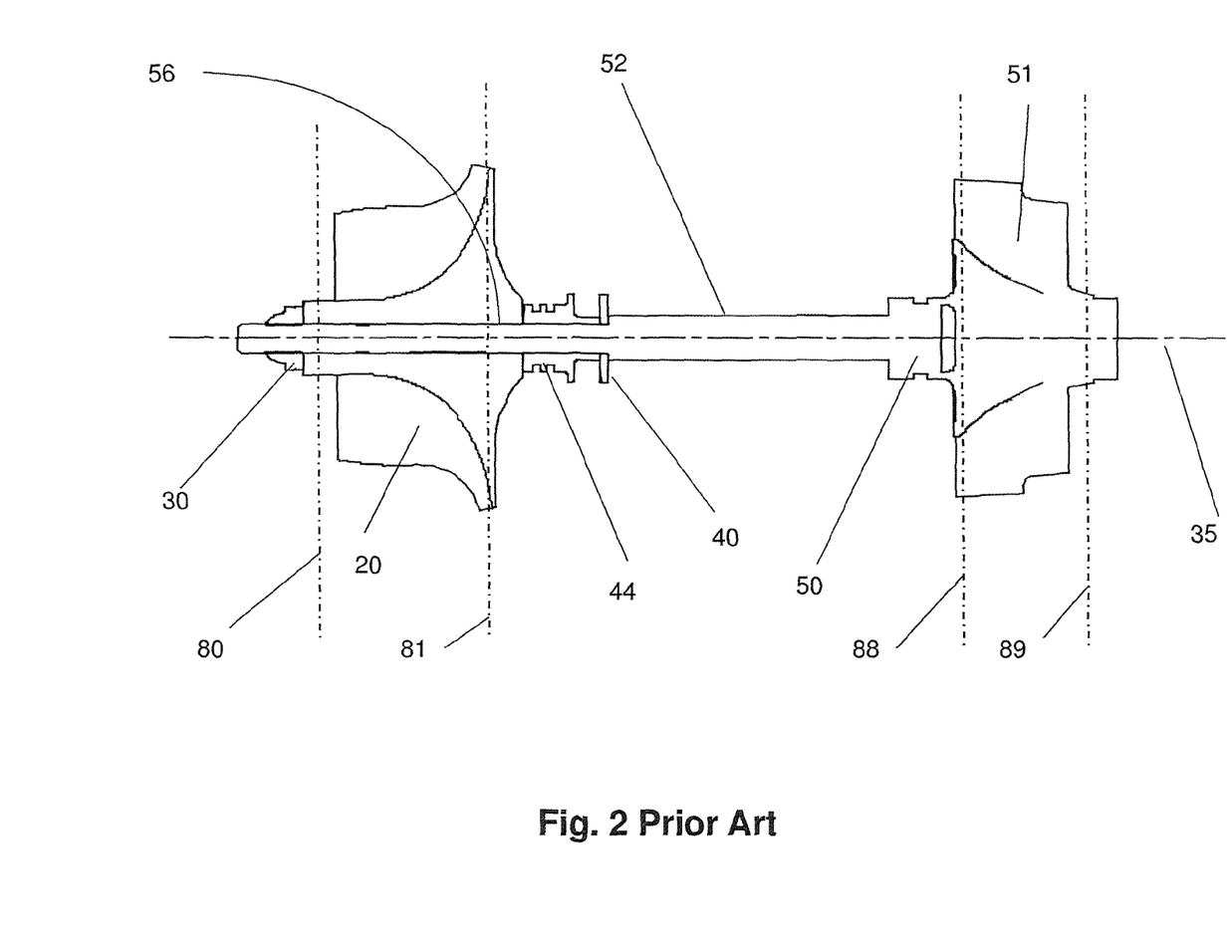
FIG. 2 depicts the rotating components in a turbocharger.

In a mid-sized, commercial Diesel turbo, for example with a 76 mm compressor wheel, the shaft and wheel (50), seen in FIG. 2, which is recognized as the welded assembly of the turbine wheel (51) to the shaft, is balanced in two planes: The plane perpendicular to the shaft at the nose (89) and the plane perpendicular to the shaft at the backface (88). Since the shaft and wheel is finished as a very accurately machined, single component with shaft diameters ground to tolerances in the 2.5 micron regime, its inherent balance is quite good. In addition to these tightly held diametral tolerances, the diameters which support the journal bearings (70) on the large diameter end (52) of the shaft and the stub shaft (56), upon which the compressor wheel and small parts are both axially and radially located, are held to a complex cylindricity tolerance measured in the regime of a micron.

The shaft and wheel component, for the turbocharger size above, is balanced within a range of 0.1 to 0.5 gm/mm.

The next components for discussion in the rotating assembly are the thrust washer and flinger. Both components are ground steel and of relatively small diameter when compared to a wheel. The thrust collar has a mass of around 10.5 gm; the flinger has a mass of around 13.3 gm. Because they are totally circular and have a high degree of finish, these components have very close to perfect balance. The next component is the compressor wheel, which has a mass of around 199 gm.

Figure 5:
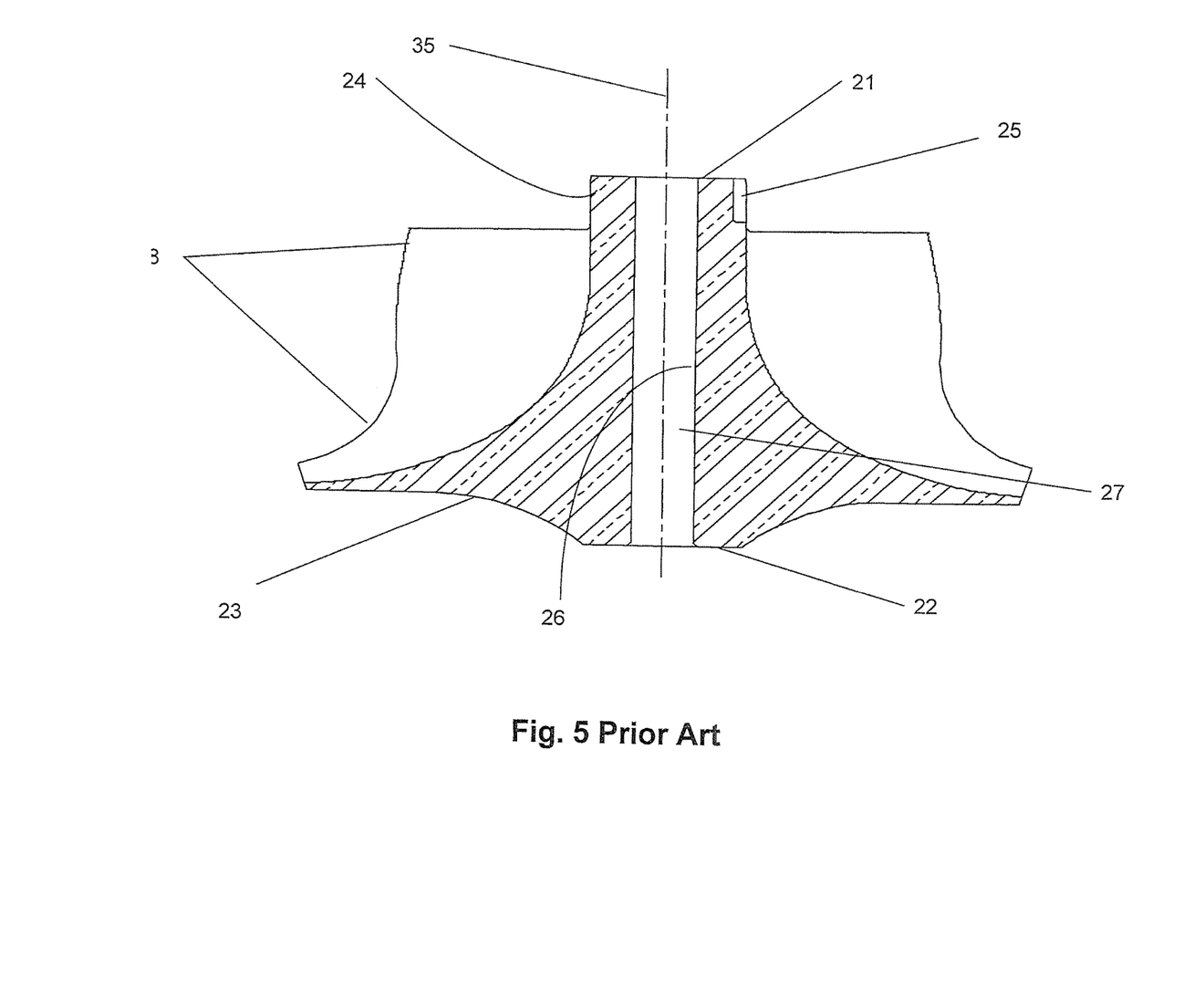
FIG. 5 depicts a machined compressor wheel section.

The compressor wheel is an extremely difficult part to machine and balance. While it is ultimately balanced to a range from 0.1 to 0.5 gm/mm in each plane, getting down to that limit is difficult. It is extremely critical to machine the bore (27) in the center of the wheel such that it is centered on the hub at both the nose end face (21) and the hub end (22). This means that the majority of the mass of the machined wheel is centered on the bore (27) of the compressor wheel. The act of centering the as-yet un-machined casting on the imaginary turbocharger centerline (35) also results in blades of equal length, which further contributes to the balance of the component. If the wheel is not chucked exactly on center with the hub profile, the machining of the blade contour surfaces (28) off center (of the hub) results in blades of different lengths. Blades of unequal length can cause not only balance and blade frequency problems, but also once-per-revolution unwanted acoustic problems.

The function of the compressor nut is to apply sufficient clamp load to the compressor wheel such that it will not rotate under any dynamic conditions, from max speed from cold start, to hot shutdown at max speed. However, in view of the influence of the nut on balancing, the compressor nut should not be referred to as a nut in the normal sense of the term.

Figure 6:
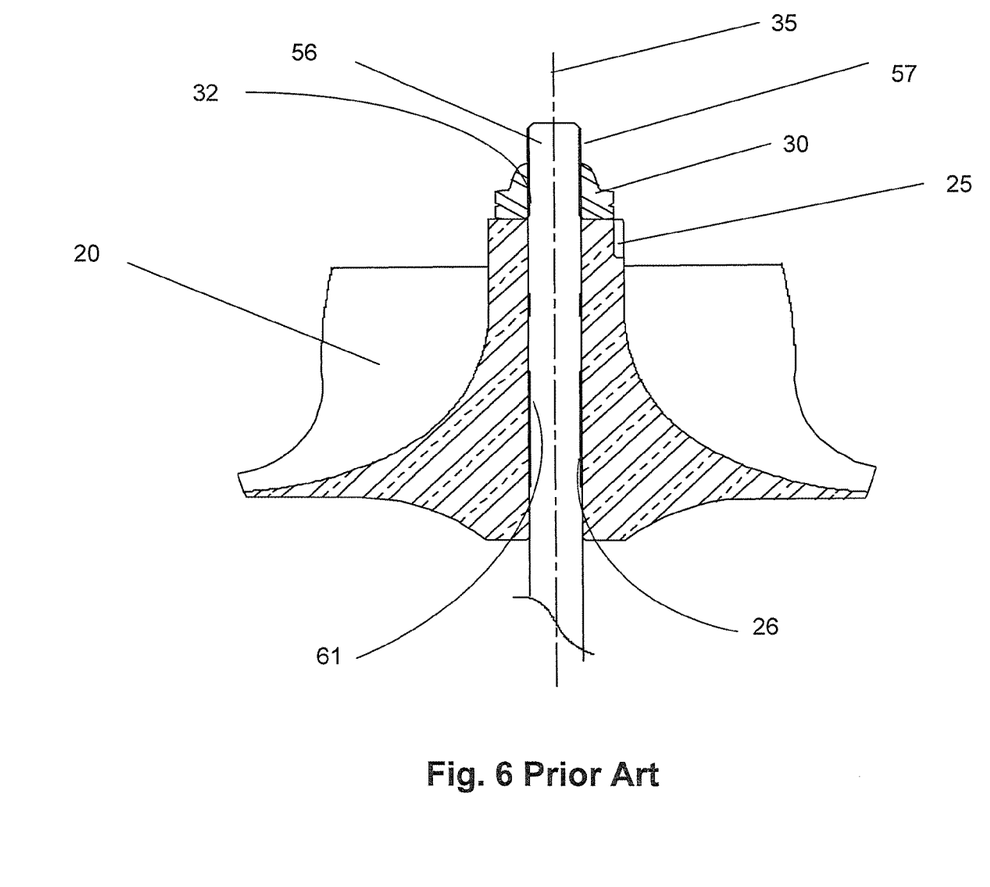
FIG. 6 depicts the compressor wheel mounted on a shaft.

While the nut is a relatively low mass item, at 6.3 gm in the turbo under discussion, its contribution to unbalance (as against balance) can be very large. A requirement of the nut is that the lower face (31), the face in contact with the face on the nose end face (21) of the compressor wheel, must be manufactured to a very tight perpendicularity tolerance to the bore of the thread in the compressor nut, in the range of 0.03 to 0.04 mm, so that when the nut is threaded onto the shaft, and clamp load applied, the aforementioned lower face of the nut is applying a load close to normal to the face (21) on the nose of the compressor wheel. Failure to apply this load either normal to the face of the compressor wheel, or parallel to the shaft centerline (35), will cause bending of the shaft, with the result that the mass of the compressor wheel, nut, and stub shaft will be displaced from the turbocharger axis (35) causing a large unbalance in the rotating assembly. Since the nut is extremely difficult to assemble exactly on axis, the mass of the nut is a critical factor in the level of unbalance the bearing system can tolerate. For the same degree of unbalance in the core, the lower the mass of the nut, the higher the geometric run-out acceptable tolerance. Much effort goes into the design of the top of the compressor wheel (21), the nut (30), and the amount of thread (57) visible above the nut to keep the mass in this zone to a minimum. If the nut is not perpendicular to the top of the compressor wheel, and parallel to the stub shaft below the nut, then the threaded part of the stub shaft above the nut (i.e., with thread no longer engaged with the thread on the stub shaft) will also be off-center with the centerline of the stub shaft below the nut and ultimately off-center with the turbocharger axis, thus contributing to even greater core unbalance.

At the point of manufacturing, all of these critically balanced items are assembled and the core balance, that is the balance of the rotating assembly, assembled to the bearing housing, supported by the journal bearings, is spun at high speed, with oil pressure supplied to support the rotating shaft on its designed oil film. This procedure checks the balance of the rotating "core". If the balance is within limits, then the core is satisfactory and is released for assembly into a complete turbocharger. If the balance is out of limit, then the core undergoes a procedure to bring the balance into limits before it is assembled into the housings to produce a turbocharger.

Accordingly, when the turbocharger leaves the factory, the rotating core is within a balance limit, and the turbocharger could be expected to live for several engine rebuild periods.

However, in the period the turbocharger is operating on the engine, the balance of the rotating core can be degraded in many ways, some of which are listed here: the turbine wheel is subjected to damage from particles, sometimes quite large, from the combustion chamber and, in case of EGR, the exhaust manifold, which causes damage ranging from bending to breaking off of parts of the blades, which then causes a deviation from the factory balance condition; the compressor wheel also can be subjected to damage inflicted by "foreign objects" which are ingested into the system. Loss of oil pressure for a period can cause loss of support of the rotating assembly, which can result in a wheel rub on either or both wheels, which, at minimum, can cause the removal of some blade material (by rubbing on the housing), which then alters the mass of several adjacent blades, or in a heavier rub, can bend the blades. Both of these events may cause a change in the balance of the rotating assembly.

If the rotating assembly does develop an unbalance condition less than those discussed above, the resultant of the core unbalance can be the generation of noise at a once per revolution frequency. With a turbocharger rotating at 150,000 RPM to 300,000 RPM, an unbalance related acoustical event will be in the frequency range of 2,500 to 5,000 Hertz. This makes the frequency somewhere around the highest producible by a flute (2093 Hz) and the highest producible by a piano (4186 Hz) so the customers do complain about the noise.

A measure of the efficacy of a turbocharger bearing system is the ability of the bearing system to control and support the rotating assembly under all conditions. Turbocharger bearing systems come in many designs, from ball bearings for very large and some high performance turbochargers, to different configurations of fixed sleeve bearings, floating oil film bearings and air bearings. They all have one thing in common, and that is the need for fine balance control of the rotating assembly.

The level of balance for the individual components is generated, to some extent, by the level of balance acceptable by the bearing system in the rotating assembly. An automotive type, oil pressure fed, well designed bearing system will present to a manufacturer a maximum unbalance which the bearing system can control and which will provide sufficient damping that it remains in control of the shaft excursions under all conditions. This means that any balance condition under the maximum unbalance condition acceptable for that bearing system on a specific engine is acceptable from an engineering point of view. The cost to achieve this level of core unbalance increases as the level of acceptable unbalance decreases. In the experience of the inventor, some turbocharger cores pass through the core balance "gate" with no additional attention. Some cores need attention, which can be as little as undoing the compressor nut, rotating some components, re-applying the clamp load, and then re-testing, to replacing components in the rotating core.

The goal of a turbocharger manufacturer is to offer product at the lowest cost, with the highest possible reliability and durability. Balance is a key factor in the durability and reliability facets. So it can be seen that there is a general need to present cores to the core test device which fall well inside the unbalance lower limit in an effort to both decrease assembly costs and increase turbocharger life.

The inventor realized that a high percentage of newly assembled turbocharger cores were not passing the core balance checking station, which meant that the turbochargers had to be re-processed, some, several times, to achieve a "pass" under the core balance limit. This re-processing resulted in both high processing and capital costs.

Figure 8:
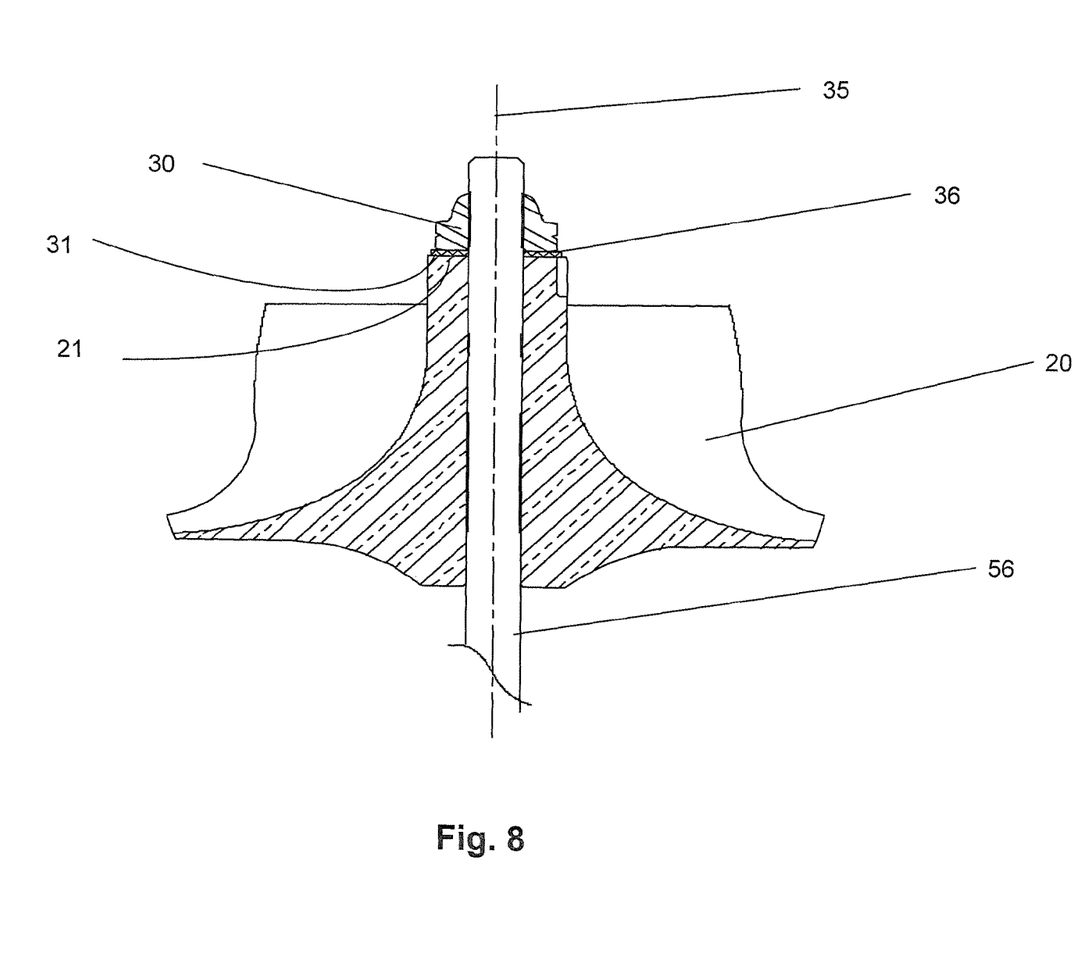
FIG. 8 depicts the first embodiment of the invention.

Contrary to the conventionally accepted design direction of reducing rotating mass and inertia, the inventor added mass and some inertia by adding a specially balancing washer, preferably ground to a surface roughness of Rz2, and preferably hardened to a hardness greater than the hardness of the compressor wheel. The washer is located between the compressor nut (30) and the top surface on the nose (21) of the compressor wheel. This washer prevents the nut from rocking and tracking on the nose of the compressor wheel.

The washer should be thin (to reduce inertia in the even that the washer is not fixed perfectly coaxially with the shaft axis of rotation). More importantly, the two faces of the washer should exhibit a high degree of planar parallelism. i.e., the opposite faces are defined by two planes which do not intersect. Since the washer exhibits a high degree of parallelism, tightening of the nut will distribute the load evenly about the circumference of the washer and prevent bending of the shaft. The washer also prevents the nut from gouging the compressor wheel.

By adding the inventive balance washer between the compressor nut and the compressor wheel, the nut is held true to the turbocharger axis and the unbalance forces of the nut, the stub shaft and the compressor wheel are minimized or non-existent.

The thickness of the washer is not critical. The washer may have a thickness of 0.003 inch (0.076 mm) to 0.02 inch (0.51 mm), preferably 0.005 inch (0.127 mm) to 0.018 inch (0.46 mm), most preferably from 0.01 inch (0.25 mm) to 0.015 inch (0.38 mm). The washer is preferably thin simply to minimize mass.

The important feature of the invention is to ensure parallelism of the washer. Parallelism is preferably determined by measuring the thickness of the washer at four cardinal points (or, at the 12, 3, 6 and 9 o'clock positions) using, e.g., a micrometer caliper. Preferably the thickness at each measured point is within +/−0.0001 inch of the median (i.e., a parallelism of 0.0002). The greater the parallelism, the better the ability to enhance balance. Depending upon the turbocharger mass and operating speed, a parallelism of 0.001 (+/−0.0005 inch of the median of measurements) could be useful; however, parallelism is preferably at least 0.0006 (measurements +/−0.0003 inch of the median), and most preferably it is 0.0002 (+/−0.0001 of the median).

The washer may be of any material suitable for use in turbochargers, and may be a metal or may be a material such as Teflon. Teflon is desirable not only for it's high temperature resistance but also for it's slipperiness. A Teflon washer will allow a nut to be tightened onto the shaft without "walking" away from alignment due to friction between the nut and wheel. The washer may be combinations or composites of material.

Washers are commercially available that have been machined to a high degree of parallelism, though they have not been employed for the purposes of the present invention. For example, Zhejiang Mayata Technology Co., Ltd. of China sells an extra precision flat washer with a thickness: 2 mm, parallelism: 3 μm, flatness: 3 μm and roughness: Ra. 0.16 μm.

Figure 7:
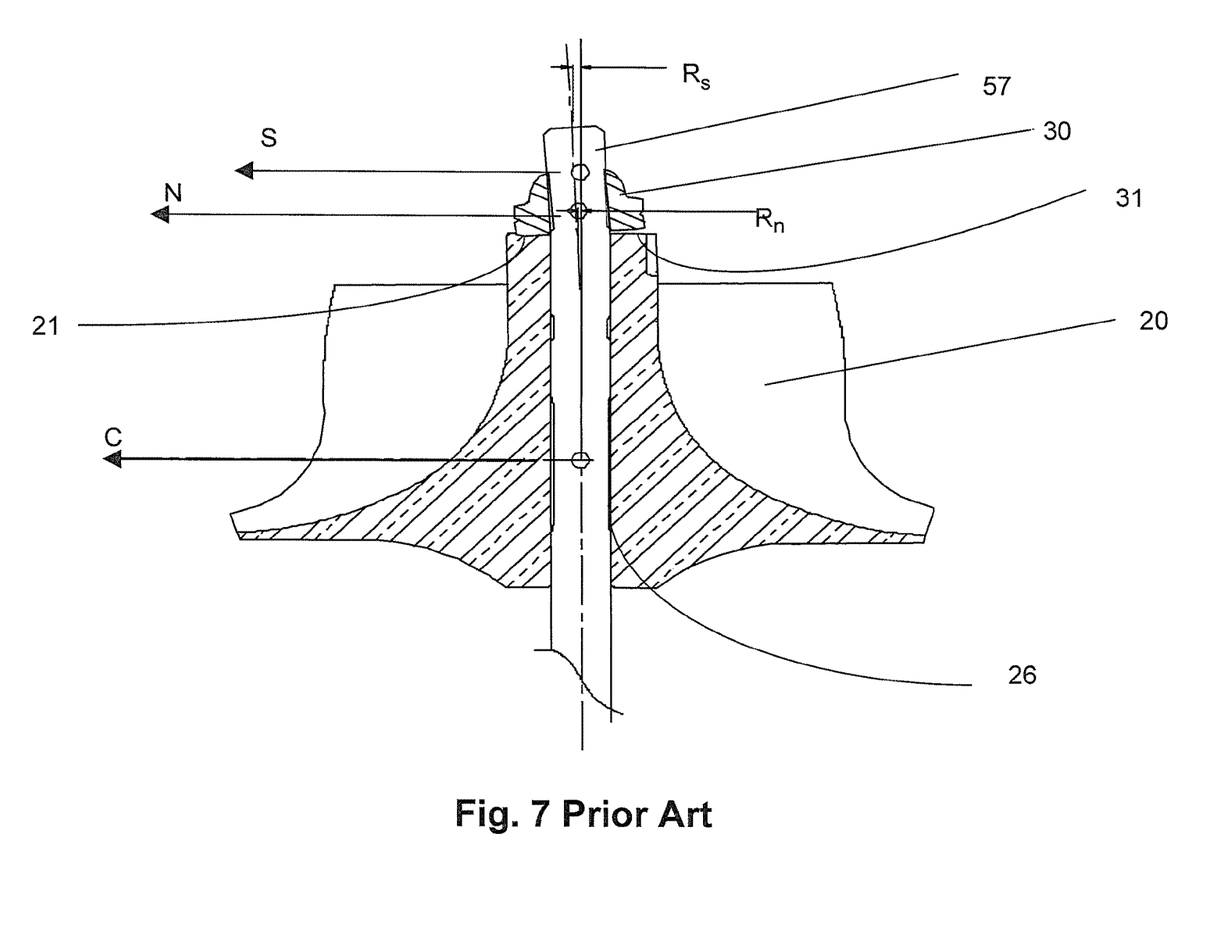
FIG. 7 depicts the assembly of FIG. 6 subjected to runout of the nut.

As shown in FIG. 7, as clamp load is applied to the compressor wheel by rotating the nut to travel down the helix angle of the thread, several events can happen. The act of rotating the nut against the face (21), on the nose of the compressor wheel, can cause the nut to dig into the face and track off center, particularly when the nut is steel and the compressor wheel is aluminum. This tracking causes the mass center of the nut to move off the turbocharger axis, which results in an unbalance (N), equal to the mass of the nut times the displacement ($R_n$), perpendicular to the turbocharger axis.

This displacement also causes a bending of the stub shaft, which results in yet another unbalance force (S) in the same direction, which is equal to the mass of the stub-shaft (57) deviated from the turbocharger axis (35) times the displacement ($R_s$). The bending of the stub-shaft can also cause a displacement of the compressor wheel center-of-gravity, which is indicated in FIG. 7 as an unbalance force of "C". Resisting these bending events is the interaction of the surface of the stub-shaft (67) which is a sliding fit to the surface (26) of the hole (27) in the compressor wheel (20), aided by the compression of the clamp load applied by the interaction of the internal threads (32) in the compressor nut (30) against the threaded end (57) of the stub-shaft (56).

By adding the inventive balance washer (36) as shown in FIG. 8 to locate between the compressor nut lower face (31) and the compressor wheel nose surface (21), the nut is held true to the turbocharger axis (35) and the unbalance forces of the nut (N), the stub shaft (S) and the compressor wheel (C) are minimized or non-existent. As a result, the major unbalance force on the compressor end is confined to the imbalance of the compressor wheel component.

Figure 9:
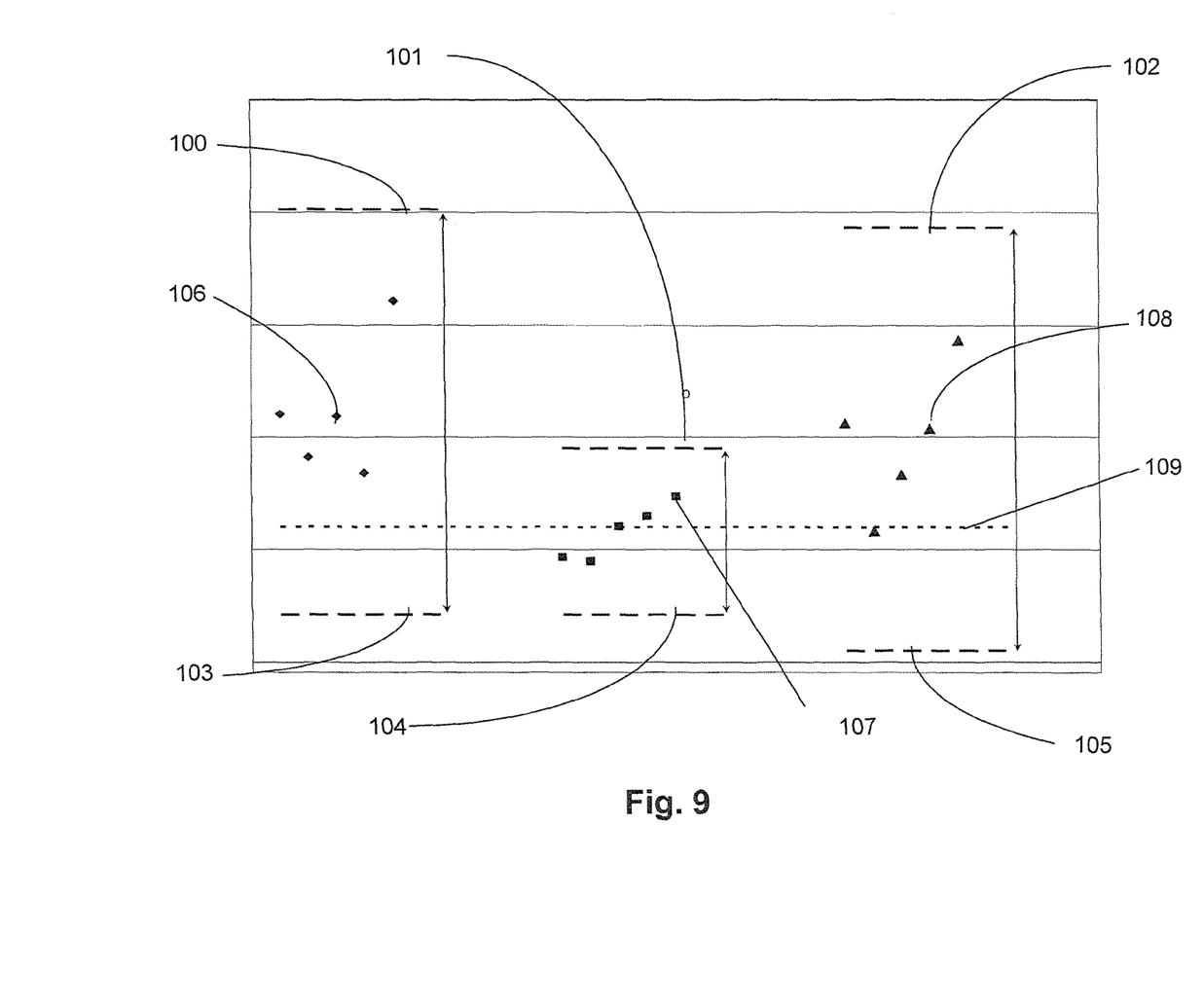
FIG. 9 depicts some assembly statistics.

FIG. 9 depicts test results of core balance as measured without the special balance washer as well as with it. The sample group (106) depicts the core unbalance values for a set of cores which are presented to the core balancer directly from production. The value of three standard deviations is represented on the upper limit by the broken line (100), and the lower limit by the broken line (103). The broken horizontal line (109) represents the maximum acceptable core unbalance. That is to say that any cores with values beneath the broken line are acceptable; any above are un-acceptable in terms of core balance. In this sample set, none of the cores presented to the balancer are acceptable. The center data set (107) is the same set of cores, but this time fitted with the balance washer. Again the horizontal broken lines (101 and 104) are the upper and lower three standard deviation boundaries. In this case, 60% of the cores were acceptable. In the sample set to the right of the chart, the same set of cores was presented with the special balance washer removed.

The range, displayed by the 3 standard deviation limits (102 and 105), has reverted to values close to those of the first case without the special balance washer. It should be noted, although, that some of the cores were just under the acceptable limit line.

Figure 10:
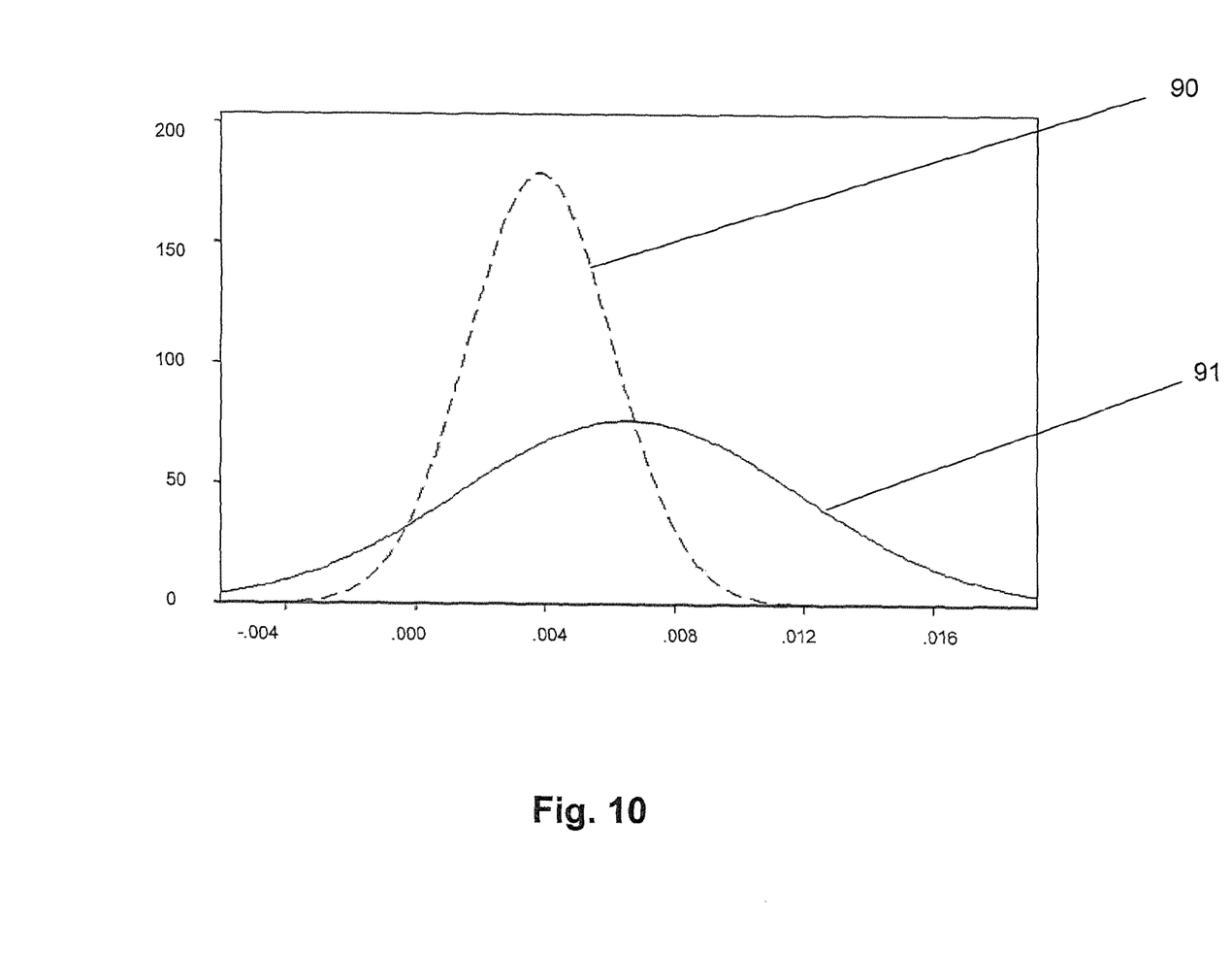
FIG. 10 depicts a histogram of the assembly unbalance.

The histogram in FIG. 10 shows the statistical curve (91) for a group of cores using the standard existing configuration and the statistical curve (90) for a group of cores using the special balance washer. The "X"-axis depicts the range of core unbalance, and the "Y"-axis depicts the density of results. The histogram shows that statistically the addition of the special balance washer not only moves the statistical curve (90) for the mean unbalance force closer to the left, which is a lower unbalance value, but it also groups the cores more tightly around the mean. Both of these features are positive in terms of throughput and reduced average unbalance values.

Figure 11:
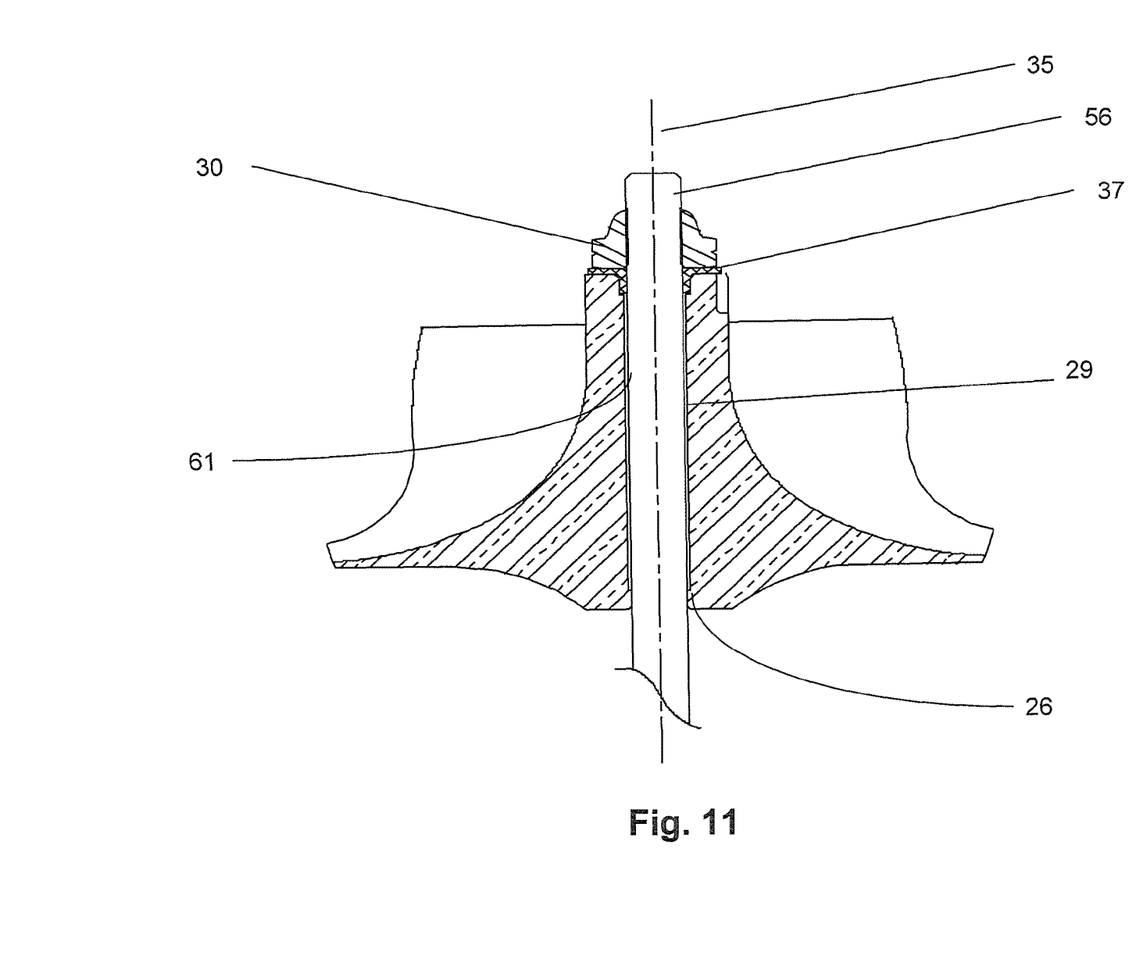
FIG. 11 depicts the second embodiment of the invention.
Figure 12:
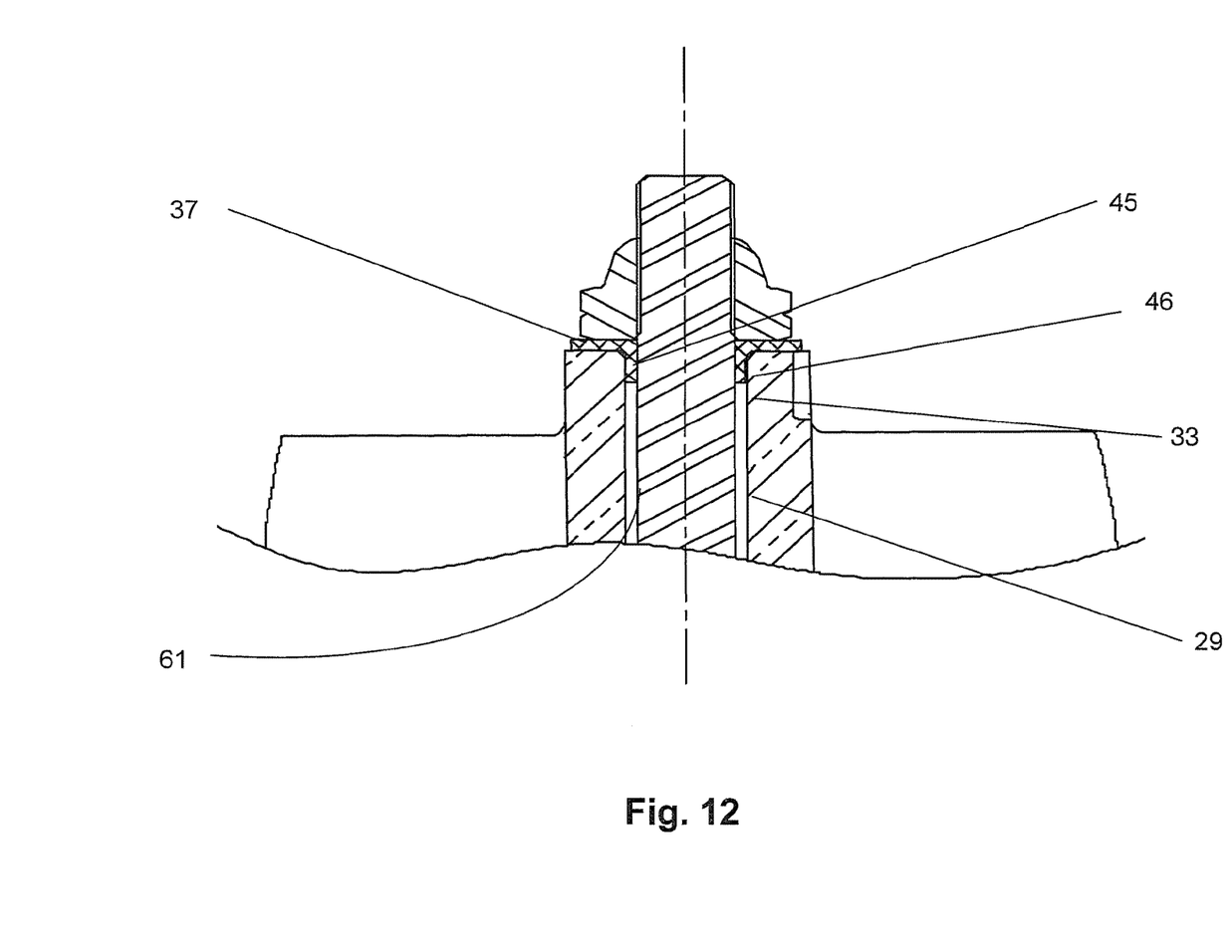
FIG. 12 depicts a magnified view of the second embodiment of the invention.

In the second embodiment of the invention, the special balance washer is designed such that the special ground and hardened washer (37), in FIGS. 11 and 12, is located between the compressor nut (30) and the top surface on the nose (21) of the compressor wheel. In addition to preventing the nut from rocking and tracking (i.e., rocking off the perpendicular (to the CL) face and then tracking on top of the CW as the edges dig in) on the nose of the compressor wheel, the flanged component centers the compressor wheel on the washer, and the inner diameter of the flanged balance washer radially centers the assembly on the shaft at the nut end of the stub shaft.

In the second embodiment of the invention, the compressor wheel, at the backface (22) or lower end, has a short section of the bore surface (26) which is a sliding fit on the stub shaft outer surface (61). This zone, with the inner diameter (45) of the flanged balance washer (37), creates the radial location of the compressor wheel, with respect to the turbocharger axis (35), without the need for the bore of the compressor wheel to maintain cylindricity for its entire length.

The undercut (29), which becomes clearance from the stub shaft outer diameter surface, (61) can be the location for the outer diameter (46) of the flanged section diameter, or the flanged section of the special balance washer can fit in a counter-bore (33) in the compressor wheel nose.

The special balance washer has an added benefit, outside the reduction in core unbalance, and that is providing a consumable mass for balance correction to the balance correction effort. Normally the balance correction (25) is executed by machining aluminum from the side of the nose of the compressor wheel as seen in FIG. 6. With a steel special balance washer, the mass removal for balance fine tuning can come from the removal of steel (which has higher density than aluminum). With a steel washer, less volume of material has to be removed for the same mass correction with still another benefit in that, when the compressor wheel is used for a second or third life there is still material available for balance correction.

Now that the invention has been described, I claim:

1. A rotating assembly, comprising
    a shaft (52) with a turbine end and including a reduced diameter stub shaft (56) part with a threaded end,
    a turbine wheel (51) rigidly connected to the turbine end of the shaft to form a shaft-and-wheel assembly (50),
    a compressor wheel (20) held in position on the stub shaft (56) by the clamp load from a compressor nut (30) threaded onto said threaded end of the shaft, and
    a balance washer (36, 37) provided between the nut and the compressor wheel, wherein the balance washer has a parallelism of ≤0.001".

2. The rotating assembly as in claim 1, wherein the balance washer has a parallelism of ≤0.0006".

3. The rotating assembly as in claim 1, wherein the balance washer has a parallelism of ≤0.0002".

4. The rotating assembly as in claim 1, wherein the balance washer has a surface roughness of Rz2 or less.

5. The rotating assembly as in claim 1, wherein the balance washer (36, 37) is made of a material having a higher hardness than the material of the compressor wheel.

6. The rotating assembly as in claim 1, wherein the compressor wheel (20) is made of aluminum or an aluminum alloy.

7. The rotating assembly as in claim 1, wherein the compressor wheel (20) is made of titanium or a titanium alloy.

8. The rotating assembly as in claim 1, wherein the compressor wheel (20) is made of a ferrous metal or ferrous alloy.

9. The rotating assembly as in claim 1, wherein the washer is made of a polymer.

10. The rotating assembly as in claim 9, wherein the polymer is Teflon.

11. A rotating assembly, comprising
    a shaft (52) with a turbine end and including a reduced diameter stub shaft (56) part with a threaded end,
    a turbine wheel (51) rigidly connected to the turbine end of the shaft to form a shaft-and-wheel assembly (50),
    a compressor wheel (20) held in position on the stub shaft (56) by a clamp load from a compressor nut (30) threaded onto said threaded end of the shaft, and
    a balance washer (36, 37) provided between the nut and the compressor wheel, wherein the balance washer has a parallelism of ≤0.001" and a thickness of 0.076 mm to 0.51 mm.

12. The rotating assembly as in claim 11, wherein the balance washer has a thickness of 0.127 mm to 0.46 mm.

13. A rotating assembly, comprising
    a shaft (52) with a turbine end and including a reduced diameter stub shaft (56) part with a threaded end,
    a turbine wheel (51) rigidly connected to the turbine end of the shaft to form a shaft-and-wheel assembly (50),
    a compressor wheel (20) held in position on the stub shaft (56) by a clamp load from a compressor nut (30) threaded onto said threaded end of the shaft, and
    a balance washer (36, 37) provided between the nut and the compressor wheel, wherein the balance washer has a parallelism of ≤0.001" and a thickness of from 0.25 mm to 0.38 mm.

* * * * *